US010724500B2

(12) United States Patent
Beekmann

(10) Patent No.: US 10,724,500 B2
(45) Date of Patent: Jul. 28, 2020

(54) METHOD FOR CONTROLLING WIND POWER PLANTS

(71) Applicant: Wobben Properties GmbH, Aurich (DE)

(72) Inventor: Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 142 days.

(21) Appl. No.: 14/910,507

(22) PCT Filed: Jul. 15, 2014

(86) PCT No.: PCT/EP2014/065138
§ 371 (c)(1),
(2) Date: Feb. 5, 2016

(87) PCT Pub. No.: WO2015/018612
PCT Pub. Date: Feb. 12, 2015

(65) Prior Publication Data
US 2016/0177925 A1 Jun. 23, 2016

(30) Foreign Application Priority Data
Aug. 6, 2013 (DE) .......... 10 2013 215 398

(51) Int. Cl.
*F03D 9/00* (2016.01)
*F03D 7/02* (2006.01)
(Continued)

(52) U.S. Cl.
CPC ........... *F03D 7/048* (2013.01); *F03D 7/0272* (2013.01); *F03D 7/0284* (2013.01); *H02J 3/18* (2013.01);
(Continued)

(58) Field of Classification Search
CPC ........ F03D 9/005; F03D 9/257; F03D 7/0272; H02J 3/18; H02J 3/386; H02P 9/008; Y02E 40/30; Y02E 10/763
See application file for complete search history.

(56) References Cited

U.S. PATENT DOCUMENTS 6,965,174 B2    11/2005  Wobben
7,392,114 B2 *   6/2008  Wobben ............... F03D 7/0272
                                                        700/286
(Continued)

FOREIGN PATENT DOCUMENTS

CN      102801181 A    11/2012
DE      102010006142 A1   8/2011
(Continued)

OTHER PUBLICATIONS

Hilloowala et al., "A Rule-Based Fuzzy Logic Controller for a PWM Inverter in a Stand Alone Wind Energy Conversion Scheme," *IEEE Transactions on Industry Applications*, vol. 32, No. 1, Jan./Feb. 1996, pp. 57-65.

*Primary Examiner* — Tulsidas C Patel
*Assistant Examiner* — Joseph Ortega
(74) *Attorney, Agent, or Firm* — Seed Intellectual Property Law Group LLP

(57) ABSTRACT

A method for supplying electrical energy into an electrical supply network by means of a wind power plant or wind farm, where the wind power plant or wind farm converts kinetic energy from wind with variable speed to electrical energy, the wind power plant or wind farm is prepared for supplying active power and reactive power and the reactive power to be fed in is set based on the wind velocity.

13 Claims, 3 Drawing Sheets

(51) Int. Cl.
*H02P 9/00* (2006.01)
*F03D 7/04* (2006.01)
*H02J 3/18* (2006.01)
*H02J 3/38* (2006.01)

(52) U.S. Cl.
CPC ............. *H02J 3/386* (2013.01); *H02P 9/008* (2013.01); *F05B 2270/3201* (2013.01); *Y02E 10/763* (2013.01); *Y02E 40/30* (2013.01)

(56) References Cited

U.S. PATENT DOCUMENTS

| | | | |
|---|---|---|---|
| 7,638,893 B2 | 12/2009 | Wobben | |
| 7,728,451 B2 | 6/2010 | Ichinose et al. | |
| 2003/0011348 A1* | 1/2003 | Lof | H02J 3/382 322/37 |
| 2006/0028025 A1* | 2/2006 | Kikuchi | F03D 9/255 290/44 |
| 2007/0085343 A1* | 4/2007 | Fortmann | F03D 7/0264 290/44 |
| 2007/0273155 A1 | 11/2007 | Barton et al. | |
| 2008/0195255 A1* | 8/2008 | Lutze | F03D 9/257 700/291 |
| 2008/0277938 A1* | 11/2008 | Oohara | F03D 7/0224 290/44 |
| 2009/0033096 A1* | 2/2009 | Jurkat | F03D 7/028 290/44 |
| 2009/0033097 A1* | 2/2009 | Jurkat | F03D 7/0272 290/44 |
| 2010/0274401 A1* | 10/2010 | Kjaer | F03D 7/0284 700/287 |
| 2011/0089693 A1* | 4/2011 | Nasiri | F03D 7/0272 290/44 |
| 2011/0148114 A1* | 6/2011 | Garcia | H02J 3/386 290/44 |
| 2011/0178646 A1 | 7/2011 | Haj-Maharsi et al. | |
| 2011/0301769 A1* | 12/2011 | Lovmand | F03D 7/028 700/287 |
| 2012/0032443 A1 | 2/2012 | Hehenberger | |
| 2012/0143537 A1 | 6/2012 | Nielsen | |
| 2012/0300510 A1* | 11/2012 | Jensen | H02J 3/36 363/35 |
| 2013/0108465 A1* | 5/2013 | Prass | E04H 12/02 416/244 R |
| 2013/0128630 A1* | 5/2013 | Jensen | H02J 3/36 363/35 |
| 2013/0138257 A1* | 5/2013 | Edenfeld | F03D 7/04 700/287 |
| 2014/0084587 A1* | 3/2014 | Beekmann | F03D 7/0276 290/44 |
| 2014/0142779 A1* | 5/2014 | Stoettrup | H02J 15/00 700/297 |
| 2014/0316592 A1* | 10/2014 | Haj-Maharsi | F03D 7/0284 700/287 |

FOREIGN PATENT DOCUMENTS

| | | |
|---|---|---|
| EP | 2381094 A1 | 10/2011 |
| JP | 2007074783 A | 3/2007 |
| JP | 2008154300 A | 7/2008 |
| JP | 2008274882 A | 11/2008 |
| JP | 2009-239990 A | 10/2009 |
| RU | 2 221 165 C2 | 6/2003 |
| WO | 2012130761 A2 | 10/2012 |

* cited by examiner

METHOD FOR CONTROLLING WIND POWER PLANTS

BACKGROUND

Technical Field

The present invention relates to a method for supplying electrical energy into an electrical supply network by means of a wind power plant or wind farm. The present invention, moreover, relates to a wind power plant for supplying electrical energy into an electrical supply network, and the present invention relates to a wind farm for supplying electrical energy into an electrical supply network.

Description of the Related Art

Supplying electrical energy into an electrical supply network by means of wind power plants or by means of a wind farm comprising several wind power plants is a matter of common knowledge. It is also known that the wind power plant or wind farm is not only responsible for supplying energy, but also for network support. So, what is assumed here as an AC network is a common electrical supply network.

An early document that describes network support by means of wind power plants is, for example, U.S. Pat. No. 6,965,174. This document describes, inter alia, the adjustment of the phase angle when supplying energy by means of a wind power plant. Later documents, such as document U.S. Pat. No. 7,638,893, also describe methods for a wind farm.

Such methods monitor the network and possibly respond to changes in the network. Nowadays, the share of wind energy in the network has increased substantially, at least in some states or regions, so that the supplying of energy, and thus possibly also network stability, may depend more and more on the prevailing wind conditions. This problem can be met by a temporary storing of energy. Such temporary storage systems may be, however, costly and often are not available in sufficient quantities, or at all.

The German Patent and Trademark Office has researched the following prior art in the priority application to the present PCT application: DE 10 2010 006 142 A1, U.S. Pat. No. 6,965,174 B2, U.S. Pat. No. 7,638,893 B2 and US 2011/0 148 114 A1.

BRIEF SUMMARY

Electrical energy is fed into an electrical supply network by means of a wind power plant or wind farm. The wind power plant or wind farm converts kinetic wind energy into electrical energy. Here, it is considered that the wind has a variable wind velocity.

The consideration of the wind velocity is based on known mean values, such as a 10-second, 1-minute, or 10-minute mean value.

What is further assumed is a wind power plant or wind farm that is prepared for supplying active power P and for supplying reactive power Q.

In this context, it is now proposed to adjust the reactive power based on the wind velocity. This proposal is based on the finding that whenever fed-in wind energy dominates in the network or network section, network conditions can depend on the wind velocity, such as frequency or voltage amplitude. However, at least the voltage amplitude can be influenced by the wind power plant by means of supplying in reactive power, and such reactive power to be fed in depends at least to a much lesser degree on the wind velocity than the active power that can be fed in. If the wind power plant operates, inter alia, in a so-called "STATCOMmode, it can feed in reactive power regardless of the wind velocity, i.e., even in still air.

What is hence proposed is to already anticipate such network influences and to feed in reactive power depending on the wind velocity in order to thus directly counteract a wind velocity-dependent supplying of active power or the resulting effects.

Preferably, the reactive power is increased if the wind velocity exceeds a wind velocity at the beginning of a storm. Such wind velocity at the beginning of a storm is a wind velocity where the wind power plant or wind farm is throttled for its own protection. If there are many wind power plants, they are even turned off in the presence of such wind velocity at the beginning of a storm.

This is based on the finding that the wind velocity's influence on the supplying of the electrical supply network may be immense especially in strong wind reaching the speed of storm winds. This means that the influence on conditions in the electrical supply network may be stronger than in case of low wind velocities, where the turbine or turbines are operated in the partial-load range, i.e., where less than the nominal power is fed in due to weak wind. This is also based on the finding that the wind velocity can vary more considerably in storm situations than in weak wind situations. Accordingly, one can also expect a more pronounced fluctuation in the feed-in performance in such storm situations.

A particular problem arises if the wind power plant or wind farm, or adjacent wind power plants or wind farms, are turned off or if they, at least, switch to a mode of operation without active power feed when storm wind velocities are reached, as in that case there is a risk of a sudden shortfall in feed-in performance. Although a shortfall in fed-in active power will normally lead primarily to a drop in frequency, especially when enough power is lost so as to cause insufficient supply to the network, it may also result in a drop in voltage. This is to be countered by supplying reactive power. This proactive increase in reactive power in the event of a storm prevents the above-described effect in the network.

Preferably, the reactive power is further increased with further increasing wind velocity once a wind velocity at the beginning of a storm has been reached. What is moreover proposed are the aspects that can be combined to reduce the reactive power with falling wind velocity as long as the wind velocity is still above the wind velocity at the beginning of a storm. Effects caused by storm-related changes in the active power feed can be countered proactively, in particular, if the active power feed acts contrary to the reactive power feed.

Preferably, a continuous course of the reactive power feed is specified for the storm range. The storm range is the range where the wind velocity lies between the wind velocity at the beginning of a storm and the wind velocity at the end of a storm. The wind velocity at the end of a storm is the wind velocity at which a wind power plant or wind farm ceases to feed active power into the electrical supply network, with a conduct of the wind power plant or wind farm being assumed that throttles the wind power plant or wind farm above the wind velocity at the beginning of a storm instead of immediately turning it off.

What is hence proposed for this storm range is to continuously increase or, in the reverse, to continuously reduce the reactive power from the wind velocity at the beginning of a storm to the wind velocity at the end of a storm.

The reactive power has then, in particular, reached a maximum value for the wind velocity at the end of a storm, which the wind power plant or wind farm can feed in as reactive power. Said maximum value can be specified by feed-in units, such as inverters of the wind power plant or of the wind farm's wind power plants, and/or by cable cross section related maximum currents.

According to yet another embodiment, it is proposed in case of wind velocities above the wind velocity at the beginning of a storm, in particular in case of wind velocities above a mean storm wind velocity, to select a reactive power that in terms of its value is higher than the nominal power. What is taken as a basis here is a nominal active power of the wind power plant or wind farm that constitutes a characteristic feature of the wind power plant or wind farm. The mean storm wind velocity here is a wind velocity between the wind velocity at the beginning of a storm and the wind velocity at the end of a storm, which adopts, for example, an arithmetic mean value of the two wind velocities. According to this embodiment, the reactive power shall be at any rate higher than the nominal active power once the wind velocity at the end of a storm has been reached, or at least almost reached.

What is taken as a basis or, rather, proposed herein, is a wind power plant that is designed for supplying current that is greater than a feed-in current that is reached when supplying in nominal active power. Such a design makes it possible to also feed in reactive power in addition to nominal active power. What is fed in in this case is an apparent power that lies above the nominal active power. This embodiment is based on the finding that whenever little or no active power is fed in, the design of the wind power plant or wind farm can be fully used to feed in reactive power. This makes it possible to feed in reactive power at a higher value than was ever meant to be fed in as active power.

Preferably, a reactive power function is specified for the reactive power to be fed in for a wind velocity range between the wind velocity at the beginning of a storm and the wind velocity at the end of a storm that defines a connection between the reactive power and the wind velocity. Such reactive power function is preferably specified as a first or second-order polynomial function, i.e., as a wind velocity-dependent straight line or parabolic function. In addition or alternatively, it can be provided as a hysteresis function, so that the function defines, at least in part, other reactive power values for the same wind values in rising wind conditions as in falling wind conditions. A polynomial function as such cannot be a hysteresis function, but the hysteresis function can be defined, for example, by two second-order polynomial functions with different parametrization. Such functions are used preferably, but one may also use other functions, such as, for example, higher-order polynomial functions, trigonometric functions, such as the sections of a harmonic function, or spline functions describing a functional connection that is described via several points of support.

What is moreover proposed is a wind power plant for supplying electrical energy into an electrical supply network, which wind power plant is prepared for performing a method at least pursuant to one of the described embodiments.

Preferably, said wind power plant features a generator that is designed to generate a generator nominal power, and it features a feed-in device that is provided for performing the supplying process. Said feed-in device is designed to feed a maximum feed-in current, and said maximum feed-in current is greater than a feed-in current for supplying the generator nominal power. Said wind power plant is thus prepared for supplying additional reactive power even if generator nominal power is already being fed.

Preferably, the wind power plant features several feed-in units that are designed, in particular, as power cabinets. The number of feed-in units, in particular when having the same size, or the number of power cabinets defines the power that can be fed in, in particular the current that can be fed in. The number of feed-in units or power cabinets required depends on the active power to be fed in, which is limited by the generator. It is now proposed to provide for more feed-in units or more power cabinets than necessary for supplying said generator nominal power. What is provided for, in particular, is at least one other feed-in unit, in particular at least two other feed-in units. The use of more feed-in units than necessary facilitates the above-described supplying of extra reactive power.

What is moreover proposed is a wind farm that combines several wind power plants. In this respect, a wind farm is characterized by the fact that the wind power plants combined therein feed into the electrical supply network through the same network connection point, or that the wind farm feeds into the electrical supply network through the same network connection point. Said proposed wind farm is also prepared for using a method pursuant to one of the above-described embodiments for supplying purposes.

Preferably, the wind farm features a central control unit for controlling the wind farm, and method steps for performing the supplying method are implemented on said central control unit. According to this embodiment, especially the specification of the reactive power to be fed in is implemented on the central control unit. If necessary, said central control unit may further provide for such calculated or specific reactive power to be forwarded to the wind farm's individual wind power plants as percentage or absolute reactive power target values.

Preferably, the wind farm is designed for supplying a larger current than the current required for supplying the maximum active power for which the wind farm is designed. Therefore, a larger dimensioning of the feed-in units is proposed here, as well. When it comes to the wind farm, this can be done by providing an adequate number of feed-in units.

Preferably, some or all of the wind power plants of the wind farm are wind power plants of the type described above pursuant to at least one embodiment.

BRIEF DESCRIPTION OF THE SEVERAL VIEWS OF THE DRAWINGS

The invention is now described in more detail below using embodiments as examples with reference to the accompanying figures.

DETAILED DESCRIPTION

Figure 1:
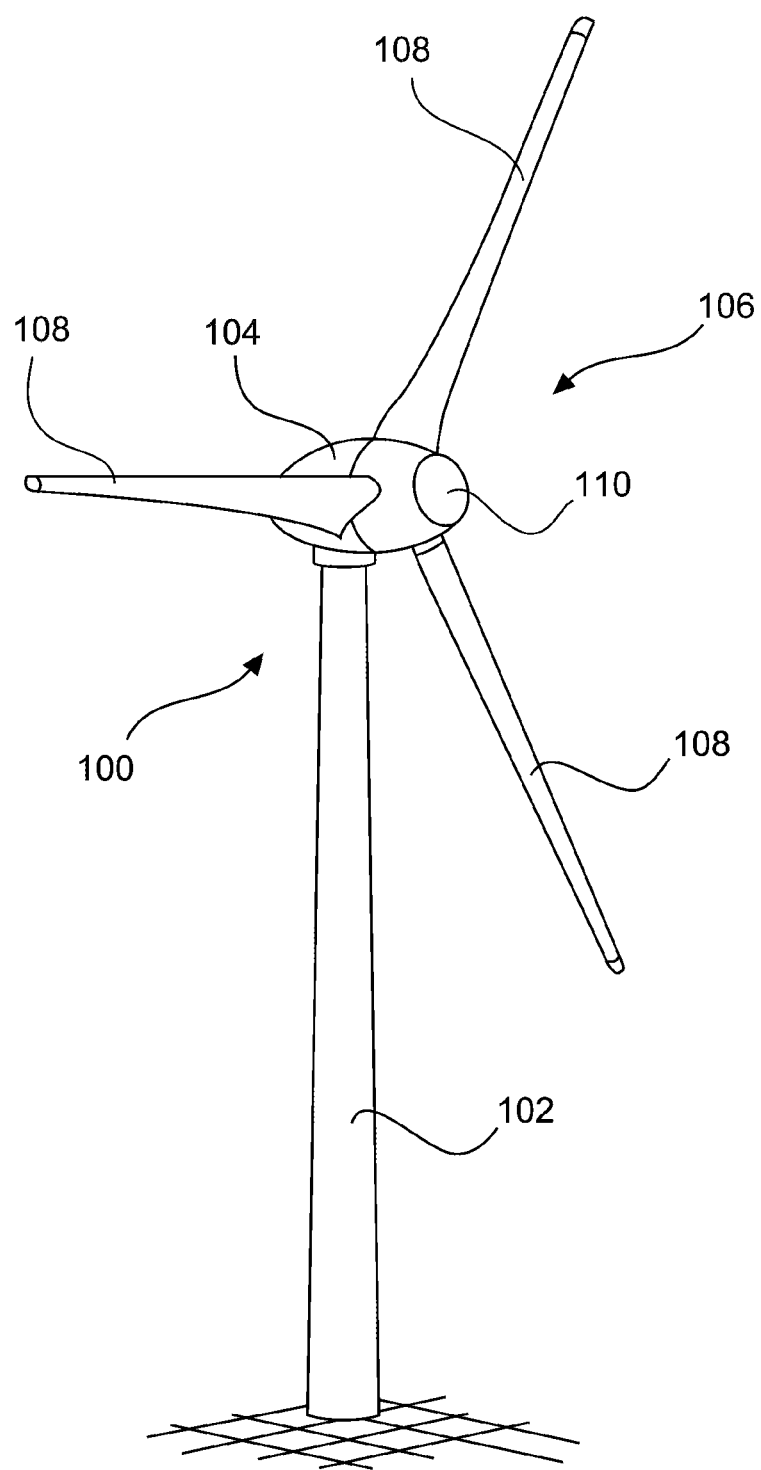
FIG. 1 shows the schematic perspective view of a wind power plant.

FIG. 1 shows a wind power plant 100 with a tower 102 and a nacelle 104. A rotor 106 with three rotor blades 108 and a spinner 110 is located on the nacelle 104. When in operation, the rotor 106 is brought to a rotating movement by the wind and thereby drives a generator in the nacelle 104.

Figure 2:
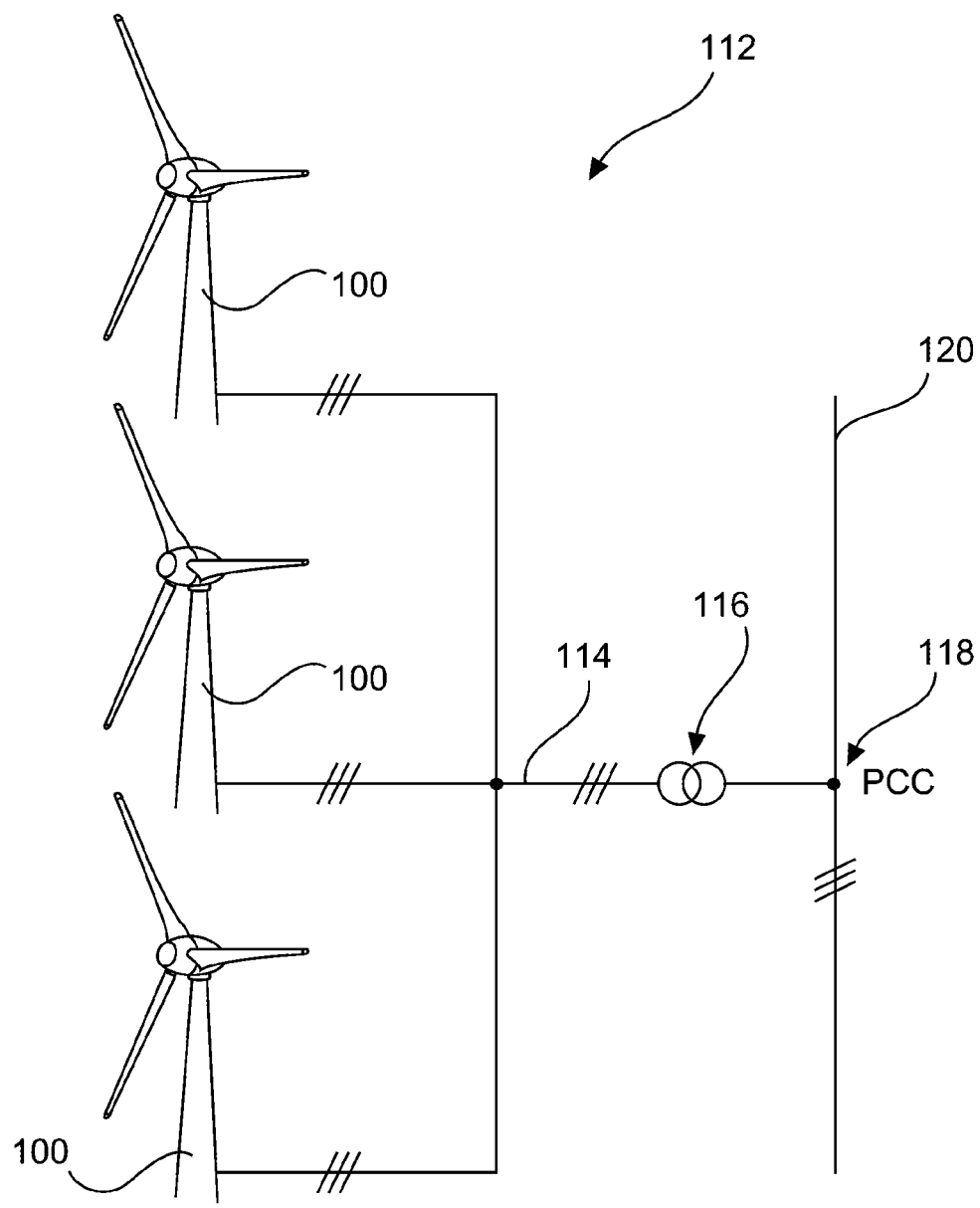
FIG. 2 shows the schematic view of a wind farm.

FIG. 2 shows a wind farm 112 with, for example, three wind power plants 100, which may be the same or different. The three wind power plants 100 are thus representative of a basically random number of wind power plants of a wind farm 112. The wind power plants 100 provide their power, in particular the generated electricity, via an electrical wind farm network 114. The currents or, respectively, powers generated by the individual wind power plants 100 are added up. Most often, a transformer 116 will be provided, which transports the voltage at the wind farm to then feed it into the supply network 120 at the supplying point 118, which is also generally referred to as a PCC. FIG. 2 is merely a simplified illustration of a wind farm 112, which does not show, for example, a control, although a control exists, of course. Also, the wind farm network 114 may be designed differently, including, for example, a transformer at the output of each wind power plant 100, to mention just one other embodiment.

Figure 3:
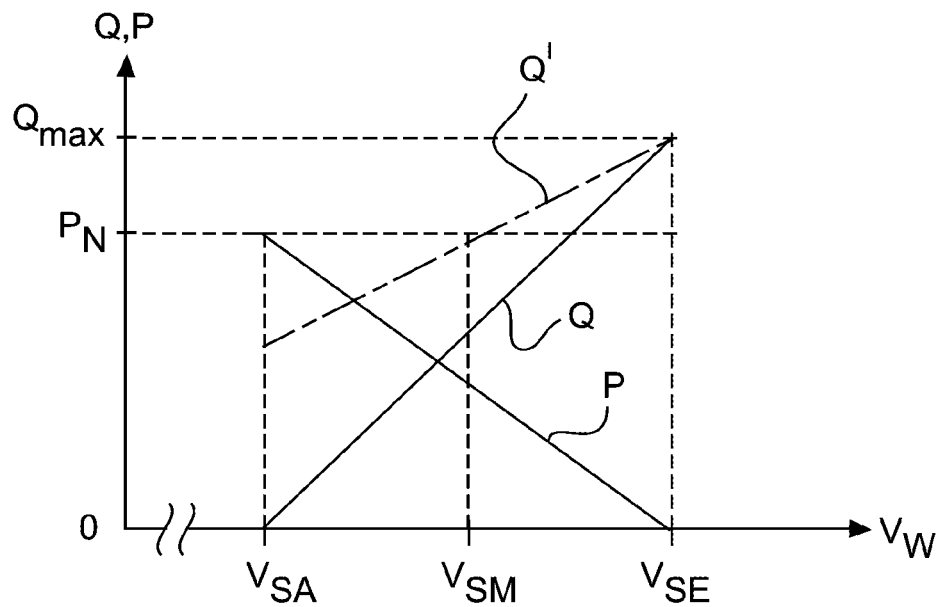
FIG. 3 shows the schematic view of a diagram that shows the interdependencies between reactive power Q to be fed in and active power P to be fed in and the wind velocity according to one embodiment.

In the diagram of FIG. 3, the wind velocity $V_W$ is plotted on the abscissa, wherein the illustration commences with the wind velocity at the beginning of a storm $V_{SA}$. Here, weaker wind ranges are irrelevant to the following explanations.

Reactive power Q and active power P are plotted on the Y-axis. The Y-axis extends from 0 to the nominal active power $P_N$. In this respect, the scaling for reactive power Q and active power P is the same, meaning that 1 watt (W) equals 1 volt-ampere reactive (VAr).

The diagram shows that the active power P has the nominal power $P_N$ for a wind velocity at the beginning of a storm $V_{SA}$. With increasing wind velocity, said active power drops continuously to 0 until wind velocity at the end of a storm $V_{SE}$ is reached.

Reactive power Q, on the other hand, increases continuously from wind velocity at the beginning of a storm $V_{SA}$ to wind velocity at the end of a storm $V_{SE}$. In this example, it has reached the maximum reactive power $Q_{max}$ that can be fed in. Preferably, it can maintain such value despite increasing wind velocities.

A dashed-line course shows an alternative dependence of reactive power Q' on wind velocity $V_W$, where the reactive power Q' for wind velocity at the beginning of a storm $V_{SA}$ is already greater than 0. This course also shows that the reactive power Q' has reached the nominal power value $P_N$ already at mean storm wind velocity $V_{SM}$. In this case, the reactive power Q' may have shown a steady value, for example in slightly lesser wind velocity conditions than the wind velocity at the beginning of a storm $V_{SA}$, which was set possibly due to a network state.

In this respect, FIG. 3 shows two variants of how to provide the reactive power based on the wind velocity for reactive power Q or Q'. The designation Q' was used only to illustrate a variant. Apart from that, said Q'—just like Q—specifies the to-be-fed-in reactive power of the respectively described embodiment.

Figure 4:
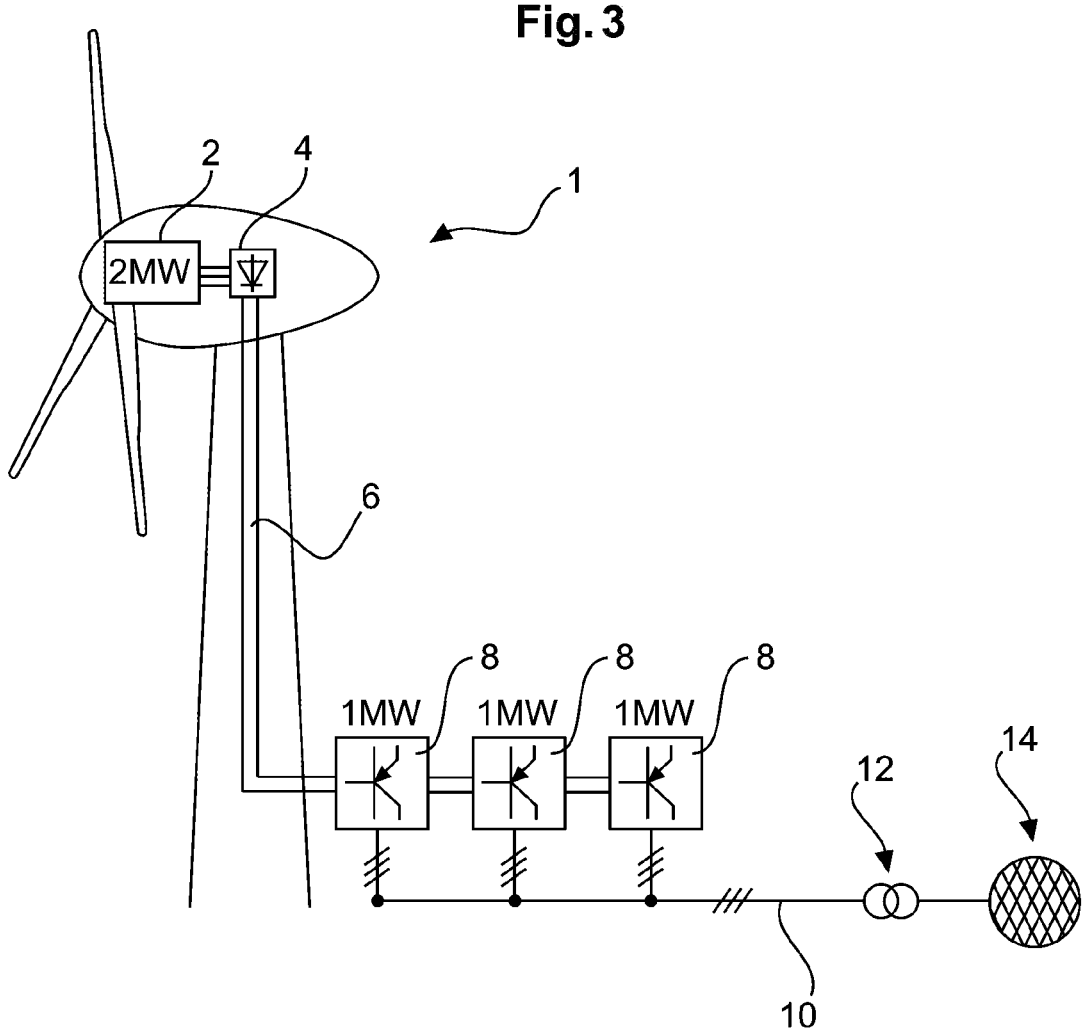
FIG. 4 shows the schematic view of the composition of a wind power plant with several feed-in units.

FIG. 4 shows the schematic view of a wind power plant 1 featuring a generator 2. Said generator 2 is designed, for example, for a nominal power of 2 MW. The depicted embodiment features a rectifier 4 that rectifies the entire power of generator 2 and leads it to the switch cabinets or feed-in units 8 via bus-bar 6.

All of the feed-in units 8 are thus connected to the same bus-bar 6, and each of these feed-in units 8 generates three-phase alternating current that is fed to output line 10. Supplying from output line 10 into the schematically shown supply network 14 takes place via a transformer 12.

Each feed-in unit or switch cabinet 8 is designed for supplying three-phase current that would equal the current that would be reached if a mere active power of 1 MW were fed in. Three of these 1-MW switch cabinets are provided for, which are hence oversized merely for supplying active power for the 2-MW generator 2. With these switch cabinets 8, it is possible to feed in the full active power of 2 MW and to also feed in reactive power. It is, moreover, possible to feed in a reactive power Q of more than 2 MVAr if only the fed-in active power is correspondingly small. With these three switch cabinets 8, one can theoretically feed in up to three MVAr if no active power is fed in.

The invention claimed is:

1. A method comprising:
   supplying electrical energy into an electrical supply network by a wind power plant or wind farm, the supplying comprising:
   using the wind power plant or wind farm, converting kinetic energy from wind with variable wind velocity to electrical energy;
   preparing the wind power plant or wind farm for supplying active power and reactive power, wherein the reactive power to be fed in is adjusted based on the wind velocity;
   throttling the wind power plant or wind farm for protecting the wind power plant or wind farm when the wind velocity exceeds a wind velocity threshold associated with a beginning portion of a storm;
   increasing the reactive power when the wind velocity exceeds the wind velocity threshold associated with the beginning portion of the storm; and
   decreasing the active power when the wind velocity exceeds the wind velocity threshold associated with the beginning portion of the storm.

2. The method of claim 1, wherein the wind velocity exceeds the wind velocity threshold, the method further comprising at least one of:
   increasing the reactive power as the wind velocity increases; and
   reducing the reactive power as the wind velocity decreases.

3. The method according to claim 1, wherein the wind velocity exceeds the wind velocity threshold at the beginning portion of the storm, the method further comprising at least one of:
   continuously increasing the reactive power as the wind velocity increases until the wind velocity has reached a wind velocity at an end portion of the storm, at which the wind power plant or wind farm no longer feeds active power into the supply network; and
   the reactive power is continuously reduced with falling wind velocity that is below the wind velocity at the end portion of the storm until the wind velocity has reached the wind velocity threshold.

4. The method according to claim 1, wherein:
   the wind power plant or wind farm is configured to supply a nominal active power; and
   at wind velocities above a mean storm wind velocity, the reactive power to be fed in has a higher value than a value of the nominal active power.

5. The method according to claim 1, wherein between a wind velocity at the beginning portion of the storm and a wind velocity at an end portion of the storm, the reactive power is set by a reactive power function that defines a relationship between the reactive power and the wind velocity, wherein the reactive power function is defined as at least one of:
- a first-order polynomial function;
- a second-order polynomial function; or
- a hysteresis function.

6. A wind power plant for supplying electrical energy into an electrical supply network using the method according to claim 1.

7. The wind power plant according to claim 6, wherein the wind power plant comprises:
- a generator configured to generate a generator nominal power; and
- a feed-in device for supplying the active power and the reactive power, wherein said feed-in device is configured to supply a maximum feed-in current that is greater than a feed-in current for supplying the generator nominal power.

8. The wind power plant according to claim 7, wherein the feed-in device includes a plurality of feed-in units, wherein the wind power plant includes more feed-in units than is utilized for supplying the nominal power generated by the wind power plant.

9. The wind power plant according to claim 8, wherein the plurality of feed-in units are power cabinets.

10. A wind farm for supplying electrical energy into a supply network, wherein the wind farm uses the method according to claim 1 for supplying electrical energy into an electrical supply network.

11. The wind farm according to claim 10, wherein the wind farm comprises:
- a central control unit for controlling the wind farm, and wherein the method steps for performing the supplying are implemented on said central control unit.

12. The wind farm according to claim 10, wherein the wind farm is configured to supply a larger current than the current required for supplying a maximum active power for which the wind farm is designed.

13. The wind farm according to claim 10, comprising a plurality of wind power plants.

\* \* \* \* \*